United States Patent
Bidkar et al.

(10) Patent No.: US 12,271,899 B2
(45) Date of Patent: Apr. 8, 2025

(54) VOICE BASED FEATURE EXTRACTION AND OPTICAL RECEPTIVE NET FOR NON-FUNGIBLE TOKEN TRANSFER

(71) Applicant: Bank of America Corporation, Charlotte, NC (US)

(72) Inventors: Prashant Anna Bidkar, Delhi (IN); Ankit Upadhyaya, Haryana (IN); Prashant Khare, Maharashtra (IN); Subrojyoti Dey, Delhi (IN)

(73) Assignee: Bank of America Corporation, Charlotte, NC (US)

( * ) Notice: Subject to any disclaimer, the term of this patent is extended or adjusted under 35 U.S.C. 154(b) by 152 days.

(21) Appl. No.: 17/989,374

(22) Filed: Nov. 17, 2022

(65) Prior Publication Data

US 2024/0169347 A1    May 23, 2024

(51) Int. Cl.
*G06Q 20/38* (2012.01)

(52) U.S. Cl.
CPC ................... *G06Q 20/389* (2013.01)

(58) Field of Classification Search
CPC ....................................... G06Q 20/389
USPC ............................................. 705/44
See application file for complete search history.

(56) References Cited

U.S. PATENT DOCUMENTS

| | | |
|---|---|---|
| 11,494,760 B1 | 11/2022 | Khan |
| 11,494,834 B2 | 11/2022 | Schneider |
| 11,496,308 B1 | 11/2022 | Khan |
| 11,496,327 B1 | 11/2022 | Kaplan et al. |
| 11,500,972 B2 | 11/2022 | Goldston et al. |
| 11,501,297 B1 | 11/2022 | Tai et al. |
| 11,501,370 B1 | 11/2022 | Paya et al. |
| 11,501,586 B1 | 11/2022 | Rojas |
| 11,536,896 B2 * | 12/2022 | Rinko .................. G02B 6/0036 |
| 2021/0097508 A1 | 4/2021 | Papanikolas |
| 2022/0354440 A1 | 11/2022 | Grajales |

(Continued)

FOREIGN PATENT DOCUMENTS

| | | |
|---|---|---|
| KR | 20220065264 | 5/2022 |
| KR | 2458298 B1 * | 10/2022 |

(Continued)

OTHER PUBLICATIONS

Jervis, Francis. "From Economization to Tokenization: New forms of economic life on-chain." Available at SSRN 3344748. (Year: 2019).*

*Primary Examiner* — Virpi H Kanervo
(74) *Attorney, Agent, or Firm* — Banner & Witcoff, Ltd.

(57) ABSTRACT

Aspects of the disclosure relate to NFT exchanges. A computing platform may generate a plurality of F-NFTs including F-NFT identifiers that configure the F-NFTs for end-to-end tracking. The computing platform may extract, from a voice communication, information of a request to transfer an F-NFT. The computing platform may generate, based on the information of the request, a text file. The computing platform may input, into a GPT-4 algorithm, the text file to produce a F-NFT contract identifying the F-NFT, the transferor of the F-NFT, and a transferee of the F-NFT. The computing platform may send, to an NFT exchange platform, the F-NFT contract, which may cause the NFT exchange platform to transfer custody of the F-NFT from an account of the transferor at a first institution to an account of the transferee at a second institution.

18 Claims, 9 Drawing Sheets

(56) References Cited

U.S. PATENT DOCUMENTS

| | | |
|---|---|---|
| 2022/0358246 A1 | 11/2022 | Mummareddi et al. |
| 2022/0358482 A1 | 11/2022 | Hamzeh et al. |
| 2022/0366022 A1 | 11/2022 | Goldston et al. |
| 2022/0366061 A1 | 11/2022 | Spivack et al. |
| 2022/0366063 A1 | 11/2022 | Pantazelos |
| 2022/0366476 A1 | 11/2022 | Penner et al. |
| 2022/0366494 A1 | 11/2022 | Cella et al. |
| 2022/0366762 A1 | 11/2022 | Nelson et al. |
| 2023/0198785 A1* | 6/2023 | Henning ............... H04L 9/3234 380/28 |
| 2023/0267450 A1* | 8/2023 | Bathen ................. G06Q 20/389 705/66 |
| 2023/0385788 A1* | 11/2023 | D'Alessandro ........ G06Q 20/10 |

FOREIGN PATENT DOCUMENTS

| | | |
|---|---|---|
| KR | 102545277 B1 * | 6/2023 |
| WO | 2018209148 A1 | 11/2018 |
| WO | WO-2022266372 A1 * | 12/2022 |

* cited by examiner

VOICE BASED FEATURE EXTRACTION AND OPTICAL RECEPTIVE NET FOR NON-FUNGIBLE TOKEN TRANSFER

BACKGROUND

Aspects of the disclosure relate to non-fungible token (NFT) transfer. Transferring assets from one organization/institution to another may be cumbersome. For example, the transfer may require consensus of multiple parties (e.g., customers, sender bank, recipient bank, regulators, and/or others) and may lead to processing delays and/or errors. Smart contracts capturing asset transfer details may need to be written through codes in instances where a distributed ledger is used, though record keeping may be inconsistent. In some instances, there might not be capability to identify the presence of alternate accounts in other enterprises in order to transfer assets. Such technical deficiencies may, for example, result in incorrect or delayed processing, which may, e.g., lead to financial loss, customer dissatisfaction, and/or other issues. Additionally, there may be an absence of an end-to-end data tracking mechanism in the case of identified abandoned properties in asset transfer. Accordingly, it may be important to improve the efficiency and accuracy of such asset transfer.

SUMMARY

Aspects of the disclosure provide effective, efficient, scalable, and convenient technical solutions that address and overcome the technical problems associated with non-fungible token (NFT) exchanges. In accordance with one or more embodiments of the disclosure, a computing platform comprising at least one processor, a communication interface, and memory storing computer-readable instructions may generate a plurality of fractional NFTs (F-NFTs), each representative of an asset of a transferor, which may include embedding, in each F-NFT, a corresponding F-NFT identifier. The computing platform may detect a voice communication including a request to transfer a F-NFT. The computing platform may extract, from the voice communication, information of the request. The computing platform may generate, based on the information of the request, a text file. The computing platform may input, into a Generative Pre-Trained Transformer 4 (GPT-4) algorithm, the text file to produce a F-NFT contract identifying the F-NFT, the transferor of the F-NFT, and a transferee of the F-NFT. The computing platform may send, to an NFT exchange platform, the F-NFT contract, which may cause the NFT exchange platform to transfer custody of the F-NFT from an account of the transferor to an account of the transferee, where the account of the transferor may be hosted by a first enterprise organization and the account of the transferee may be hosted by a second enterprise organization, and where the F-NFT may be configured for end-to-end tracking, using the corresponding F-NFT identifier, by the first enterprise organization and the second enterprise organization.

In one or more instances, the NFT exchange platform may maintain a distributed ledger including F-NFT contracts for the first enterprise organization and the second enterprise organization. In one or more instances, the NFT exchange platform may validate, using the distributed ledger, the request to transfer the F-NFT.

In one or more examples, the NFT exchange platform may modify, based on successful validation of the request to transfer the F-NFT, the distributed ledger to include a new entry indicating the transfer of the F-NFT to the transferee.

In one or more examples, the request to transfer the F-NFT may include a document, and the F-NFT contract may be generated, based in part, on the document.

In one or more instances, the computing platform may generate, using the document, a three dimensional optical feature nomogram. In one or more instances, generating the three dimensional optical feature nomogram may include: exposing the document to a photon source, where light from the photon source is passed through a polarizer and a beam splitter prior to reaching the document, and applying an optical receptive net to the exposed document to produce the three dimensional optical feature nomogram.

In one or more examples, applying the optical receptive net may include: applying a diffraction plate to the exposed document to produce feature maps, extracting, from the feature maps, optical features, and applying a smart glass to the optical features, to produce the three dimensional optical feature nomogram. In one or more examples, generating the F-NFT contract may be further based on the three dimensional optical feature nomogram. In one or more examples, an error rate of F-NFT generation using the three dimensional optical feature nomogram may be lower than an error rate of the F-NFT generation when executed without the three dimensional optical feature nomogram.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe using voice analysis and an optical receptive net for enhanced asset transfers. Financial institutions and customers may face several challenges when they want to transfer assets (e.g., equity, bonds, mutual funds, annuities, etc.) from one financial institution to another. Coordination between the financial institutions is very cumbersome and could lead to delayed and/or otherwise incorrect asset transfers. In the case of identification of abandoned properties, customer's asset transfers need to be done after getting consent from the customer through skip tracing.

Even in the case of blockchain based asset transfer systems, technical challenges may be faced. For example, asset transfer mechanisms may need consensus of multiple parties (e.g., customers, sender bank, receiver bank, regulator, or the like). Additionally or alternatively, smart contracts capturing asset transfer details may need to be written through code. Additionally or alternatively, consistency in record keeping may be critical as all the involved parties should have availability of the same information to update their ledgers accordingly. Additionally or alternatively, there may be a lack of capability to identify the presence of alternate accounts in other financial institutions in order to transfer assets. Additionally or alternatively, there may be potential financial loss in the cases where transfers are processed incorrectly or delayed. Such incorrect processing may lead to customer dissatisfaction (e.g., incorrect client details against the asset movement may lead to transferring an incorrect account/quantity). Additionally or alternatively, there may be an absence of an end-to-end tracking mechanism in the case of identified abandoned properties.

Accordingly, the solution described herein may leverage a voice based fractional non-fungible tokens (F-NFT) based asset transfer through an NFT exchange. Consent may be given from customers to transfer assets of accounts to other existing accounts at different banks. A central treasury may collate the data through an application programming interface (API) from all the banks on different types of accounts that an individual customer may have across various banks and/or different states. A causation algorithm may be used to prioritize forecasted dormant account volume and necessary asset transfer volume. Parameters such as value of an account, days left before abandonment/escheatment, frequent scenarios in which a customer asked for asset transfer, number of accounts being abandoned for a state, whether a customer is deceased or not, and/or other information may be used for prioritization through a causation algorithm. Bots may be used to process the prioritized volume by taking subsequent steps like automated calls, emails, letters, and/or other information to the customer for skip tracing, receiving customer responses, proceeding for escheatment, or the like.

An NFT exchange may assign unique NFT accounts to overall accounts at an individual customer level, which may cover various types of asset classes. Fractional NFT ledgers may be created for the customer's account, which may be updated per any added or deleted assets. The NFT account and fractional NFT contract may be updated on a real time basis in the case of any added or deleted assets in any of the linked accounts across different banks. Once customer consent is received to transfer the assets to other accounts, the assets may be easily transferred through the NFT exchange and an upgraded fractional non-fungible ledger based on voice inputs received from the customer. The fractional non-fungible ledger may be updated accordingly immediately after getting consensus from all parties involved using a consensus mechanism.

Also described herein is a method of voice based fractional NFT upgradation for account asset transfer across banks and an optical receptive net. Customer confirmation may be provided over the phone from a customer to transfer an asset to another account, which may be processed through a voice input extracting engine, which may decide which asset needs to be transferred from which financial institution to which other financial institution. An F-NFT search functionality may search and open the F-NFT ledger pertaining to the customer in the NFT exchange. An existing F-NFT ledger may be upgraded based on the voice inputs post the transfer of the assets.

A document reconciliation process using an optical receptive net may identify the information available on the document with the help of photon light waves, that may be processed through the receptive net to present a three dimensional image of the information for more accurate results. Photons from a photon source may be passed through the polarizer to convert them into monochromatic intense beam photons, which may be passed through a photon beam splitter and impinged on documents to create an optical image of the document, which may be sent to receptive feature maps of the optical receptive net. Receptive feature maps may further extract the feature information and pass it to the next layer's receptive feature maps. A bypass feed may also be provided to individual bundles of receptive feature maps to provide more feature information for further refinement of the features. These final extracted features may create a three dimensional optical feature nomograph, which may compare and reconcile individual fields.

Figure 1A:
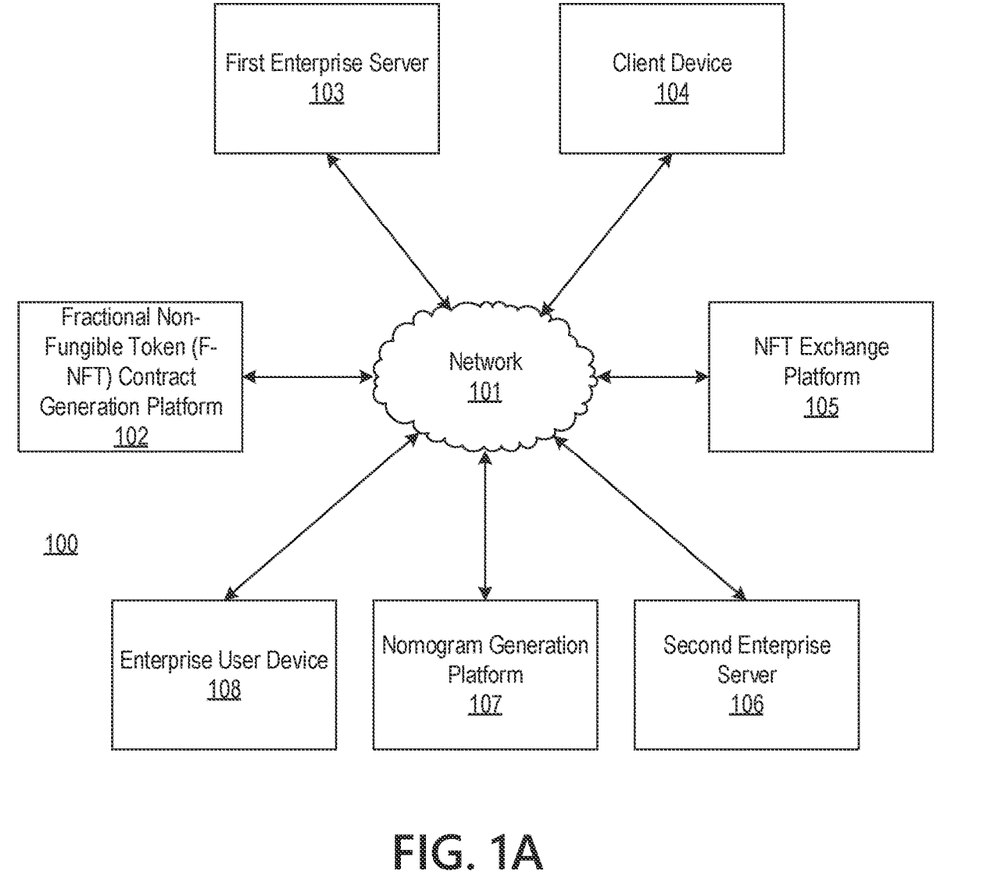
FIGS. 1A-1B depict an illustrative computing environment for voice based feature extraction and an optical receptive net for improved transfer of NFTs in accordance with one or more example embodiments.
Figure 1B:
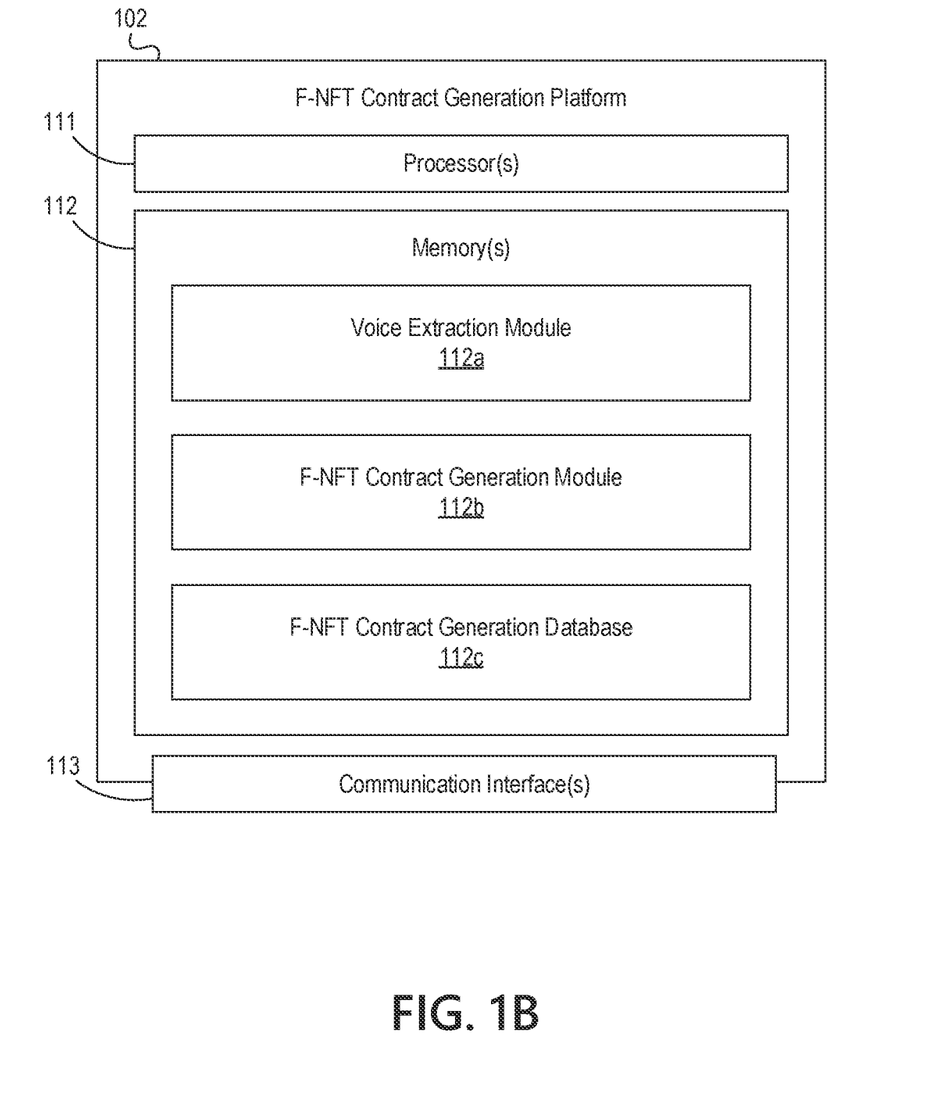

FIGS. 1A-1B depict an illustrative computing environment for voice based feature extraction and an optical receptive net for improved transfer of NFTs in accordance with one or more example embodiments. Referring to FIG. 1A, computing environment 100 may include one or more computer systems. For example, computing environment 100 may include F-NFT contract generation platform 102, first enterprise server 103, client device 104, NFT exchange platform 105, second enterprise server 106, nomogram generation platform 107, and enterprise user device 108.

As described further below, F-NFT contract generation platform 102 may be a computer system that includes one or more computing devices (e.g., servers, server blades, or the like) and/or other computer components (e.g., processors, memories, communication interfaces) that may be used to perform voice extraction, F-NFT contract generation, nomogram generation, and/or other functions. For example, the F-NFT contract generation platform 102 may be configured to extract intent from a voice request, generate a text file based on the request, and generate a F-NFT contract based on the text file, which may, e.g., be used to automatically execute F-NFT transfers between individuals and/or enterprises.

The first enterprise server 103 may be a computer system that includes one or more computing devices (e.g., servers, server blades, or the like) and/or other computer components (e.g., processors, memories, communication interfaces) that may be used to store information for a first enterprise organization (e.g., a financial institution), such as account information, or the like.

Client device 104 may be a computing device configured for use in initiating an NFT transfer. For example, the client device 104 may be a mobile device, laptop computer, desktop computer, tablet, and/or other device that may be used (e.g., by a client of an enterprise corresponding to the first enterprise server 103) to initiate a request to transfer an NFT (or F-NFT) from an account of the client to an account of another. In some instances, the client device 104 may be configured to display one or more graphical user interfaces (e.g., transfer request interfaces, transfer confirmation interfaces, or the like).

NFT exchange platform 105 may be a computer system that includes one or more computing devices (e.g., servers, server blades, or the like) and/or other computer components (e.g., processors, memories, communication interfaces) that may be used to manage an exchange of NFTs between multiple individuals and/or enterprises. For example, the NFT exchange platform 105 may host and maintain a distributed ledger, configured to store one or more F-NFT contracts. In some instances, the distributed ledger may be configured for access by multiple enterprise organizations (e.g., financial institutions).

The second enterprise server 106 may be a computer system that includes one or more computing devices (e.g., servers, server blades, or the like) and/or other computer components (e.g., processors, memories, communication interfaces) that may be used to store information for a second enterprise organization (e.g., a financial institution), such as account information, or the like.

Nomogram generation platform 107 may be a computer system that includes one or more computing devices (e.g., servers, server blades, or the like) and/or other computer components (e.g., processors, memories, communication interfaces) that may be used to support and/or otherwise apply an optical receptive net (e.g., to one or more received documents) for nomogram generation. Although nomograph generation platform 107 is illustrated as being separate from the F-NFT contract generation platform 102, in some instances, these may be integrated in a common system without departing from the scope of the disclosure.

Enterprise user device 108 may be a computing device configured for use in communicating with a client device (e.g., client device 104). For example, the enterprise user device 108 may be a mobile device, laptop computer, desktop computer, tablet, and/or other device that may be used (e.g., by an employee of an enterprise corresponding to the first enterprise server 103) to communicate with clients (e.g., who may request to transfer an NFT (or F-NFT) from an account of the client to an account of another). In some instances, the enterprise user device 108 may be configured to display one or more graphical user interfaces (e.g., client communication interfaces, transfer confirmation interfaces, or the like).

Computing environment 100 also may include one or more networks, which may interconnect F-NFT contract generation platform 102, first enterprise server 103, client device 104, NFT exchange platform 105, second enterprise server 106, nomogram generation platform 107, enterprise user device 108, or the like. For example, computing environment 100 may include a network 101 (which may interconnect, e.g., F-NFT contract generation platform 102, first enterprise server 103, client device 104, NFT exchange platform 105, second enterprise server 106, nomogram generation platform 107, enterprise user device 108, or the like).

In one or more arrangements, F-NFT contract generation platform 102, first enterprise server 103, client device 104, NFT exchange platform 105, second enterprise server 106, nomogram generation platform 107, and/or enterprise user device 108 may be any type of computing device capable of sending and/or receiving requests and processing the requests accordingly. For example, F-NFT contract generation platform 102, first enterprise server 103, client device 104, NFT exchange platform 105, second enterprise server 106, nomogram generation platform 107, enterprise user device 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of F-NFT contract generation platform 102, first enterprise server 103, client device 104, NFT exchange platform 105, second enterprise server 106, nomogram generation platform 107, enterprise user device 108 may, in some instances, be special-purpose computing devices configured to perform specific functions.

Referring to FIG. 1B, F-NFT contract generation platform 102 may include one or more processors 111, memory 112, and communication interface 113. A data bus may interconnect processor 111, memory 112, and communication interface 113. Communication interface 113 may be a network interface configured to support communication between F-NFT contract generation platform 102 and one or more networks (e.g., network 101, or the like). Memory 112 may include one or more program modules having instructions that when executed by processor 111 cause F-NFT contract generation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of F-NFT contract generation platform 102 and/or by different computing devices that may form and/or otherwise make up F-NFT contract generation platform 102. For example, memory 112 may have, host, store, and/or include voice extraction module 112a, F-NFT contract generation module 112b, and F-NFT contract generation database 112c.

Voice extraction module 112a may have instructions that direct and/or cause F-NFT contract generation platform 102 to execute advanced techniques to automatically extract (e.g., from a voice communication between a client and employee) details from an NFT transfer request, which may be used to generate a F-NFT contract to cause the requested transfer. F-NFT contract generation module 112b may execute advanced techniques to generate an F-NFT contract based on the extracted voice details (e.g., using a GPT-4 algorithm, or the like). F-NFT contract generation database 112c may store information used by NFT contract generation module 112b and/or F-NFT contract generation platform 102 to provide NFT transfers, and/or in performing other functions.

Figure 2A:
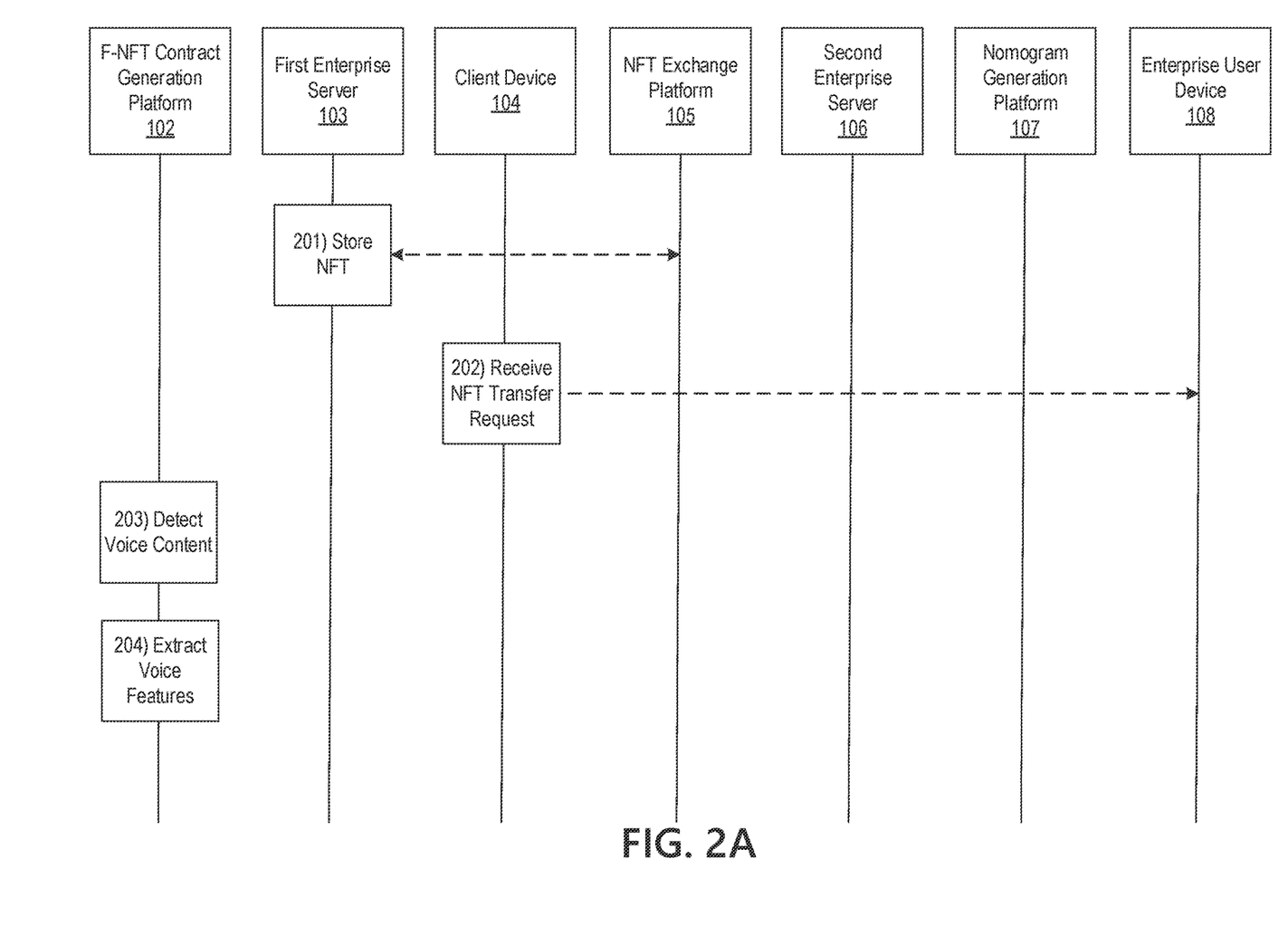
FIGS. 2A-2E depict an illustrative event sequence for voice based feature extraction and an optical receptive net for improved transfer of NFTs in accordance with one or more example embodiments.

FIGS. 2A-2E depict an illustrative event sequence for voice based feature extraction and an optical receptive net for improved transfer of NFTs in accordance with one or more example embodiments. Referring to FIG. 2A, at step 201, the first enterprise server 103 may store an NFT. In some instances, the first enterprise server 103 may store the NFT in its own memory, and/or may communicate with the NFT exchange platform 105 to store the NFT. In some instances, the first enterprise server 103 may store the NFT to represent a client's collection of assets, accounts (e.g., individual retirement account, retail account, business account, and/or other accounts), financial portfolio, and/or other information. For example, the first enterprise server 103 may store one or more F-NFTs, corresponding to the NFT, each representing a given asset type (e.g., a first F-NFT representing commodities, a second F-NFT representing equities, a third F-NFT representing derivatives, a fourth F-NFT representing mutual funds, and/or additional or alternative F-NFTs representing other asset types).

In some instances, in storing the F-NFTs, the first enterprise server may generate an NFT identifier for each F-NFT, and may embed the NFT identifier into the corresponding F-NFT (and/or otherwise store a correlation between the NFT identifier and the corresponding F-NFT). In some instances, in generating the NFT identifier, the first enterprise server 103 may generate an alpha-numeric and/or other unique identifier. In some instances, the NFT identifiers may be unique to each asset within the asset types. In some instances, the generation of the NFT identifier and its storage and/or embedding may be performed by the first enterprise server 103.

At step 202, the client device 104 may receive a request to transfer an asset corresponding to the NFT. For example, the client device 104 may receive a request to transfer an asset corresponding to a particular NFT identifier (e.g., commodities, equities, derivatives, mutual funds, and/or otherwise). For example, a customer at a first financial institution may decide to move assets to a second financial institution and/or transferee.

In some instances, the asset transfer request may be initiated based on a notification of account dormancy. For example, a model may be trained to prioritize accounts based on value of the account (e.g., cash value, securities value, etc.), days left for abandonment/escheatment, number of accounts going abandoned for a state, whether a customer is deceased, beneficiary tracking, relationship manager identity, and/or other information. Based on the prioritization, automated calls, emails, letters and/or other methods of communication may be used to contact an account owner for skip tracing. If a response is received, the customer may be prompted to perform an asset transfer. Otherwise, if a response is not received, escheatment may be performed.

In some instances, the client device 104 may receive the NFT transfer request during a communication between the client device 104 and the enterprise user device 108, and/or another computing system. For example, the client device 104 may be engaged in a voice communication session with the enterprise user device 108, in which the client operating the client device 104 makes a verbal request to the employee operating the enterprise user device 108. In some instances, such verbal communication of the transfer request may lead to errors (e.g., due to failure to understand a complete ask by the client). However, by automatically processing voice communication through the voice extraction process below, such errors may be reduced.

At step 203, the F-NFT contract generation platform 102 may monitor the first enterprise server 103, client device 104, enterprise user device 108, and/or other devices to detect whether or not a voice communication has been initiated. Upon detecting a voice communication (e.g., the voice communication described above with regard to step 202), the F-NFT contract generation platform 102 may proceed to step 204.

At step 204, the F-NFT contract generation platform 102 may extract voice features from the voice communication. For example, the F-NFT contract generation platform 102 may input an audio feed from the voice communication into a pre-trained natural language processing, natural language understanding, and/or other model to identify key features of the voice communication (e.g., an intent, an NFT to be transferred, a transferor identity, a transferee identity, account information, and/or other information).

Figure 2B:
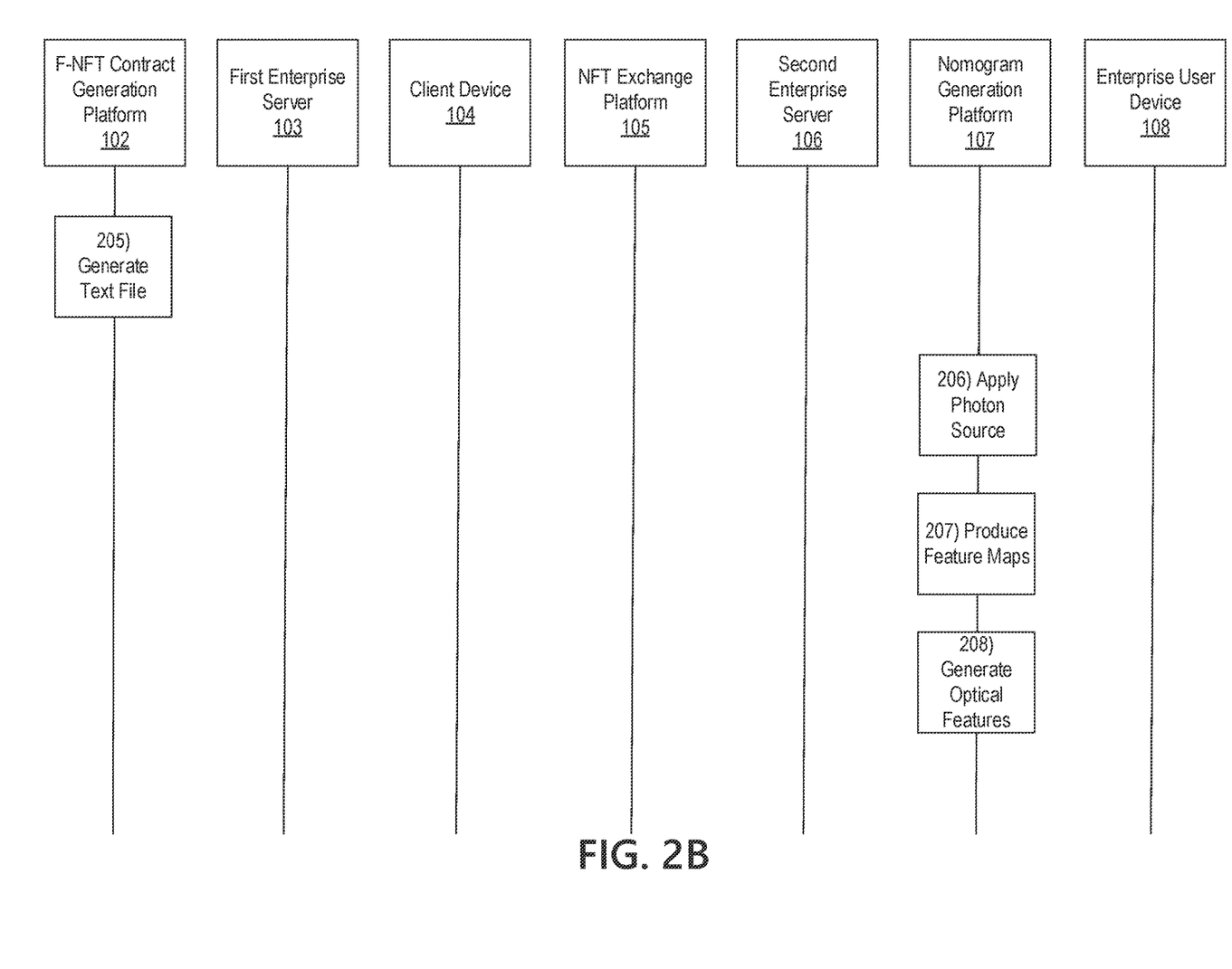

Referring to FIG. 2B, at step 205, the F-NFT contract generation platform 102 may generate, based on the extracted key features, a text file. For example, the F-NFT contract generation platform 102 may generate a text file that includes the extracted key features of the voice communication (e.g., an intent, an NFT to be transferred, a transferor identity, a transferee identity, account information, and/or other information). In some instances, generation of the text file may include one or more processing steps to reduce an amount of text from being an entire transcript of the communication, to simply including the extracted features. In some instances, step 205 may be performed in real time as step 204 is performed. For example, key features may be dynamically extracted from the conversation and added to the text file as they are identified.

At step 206, the nomogram generation platform 107 may apply a photon source to any received documents. For example, one or more documents may have been received by the client device 104, first enterprise server 103, and/or other computing system as part of the NFT transfer request. For example, documents needed to verify an identity, verify ownership, provide an intended recipient, perform the asset transfer, and/or other documents may have been received in addition or as an alternative to the voice communication described above at step 202. Although the processing of such documents may, in some instances, be manually intensive, time consuming, and/or error prone, by performing the methods described herein, automation of the document processing tasks may be facilitated and these technical problems may be resolved.

In these instances, the one or more documents may be sent to the nomogram generation platform 107 and/or the nomogram generation platform 107 may be otherwise configured to access the one or more documents. In applying the photon source to the one or more documents, the nomogram generation platform 107 may apply the photon source through a polarizer and a photon beam splitter (in sequence).

At step 207, the nomogram generation platform 107 may produce one or more feature maps for each of the one or more documents. For example, the nomogram generation platform 107 may feed the one or more documents, on which the photon source was applied, through a diffraction plate and into an optical receptive net, which may, e.g., be and/or include a deep neural network, trained to understand the features of the one or more documents. In some instances, the deep neural network may include a bypass mechanism used to feed initial iterations of the model into later iterations via a dynamic feedback loop so as to improve accuracy of the model.

At step 208, the nomogram generation platform 107 may generate one or more optical features (e.g., photonic patterns) for the one or more documents using the one or more feature maps generated at step 207.

Figure 2C:
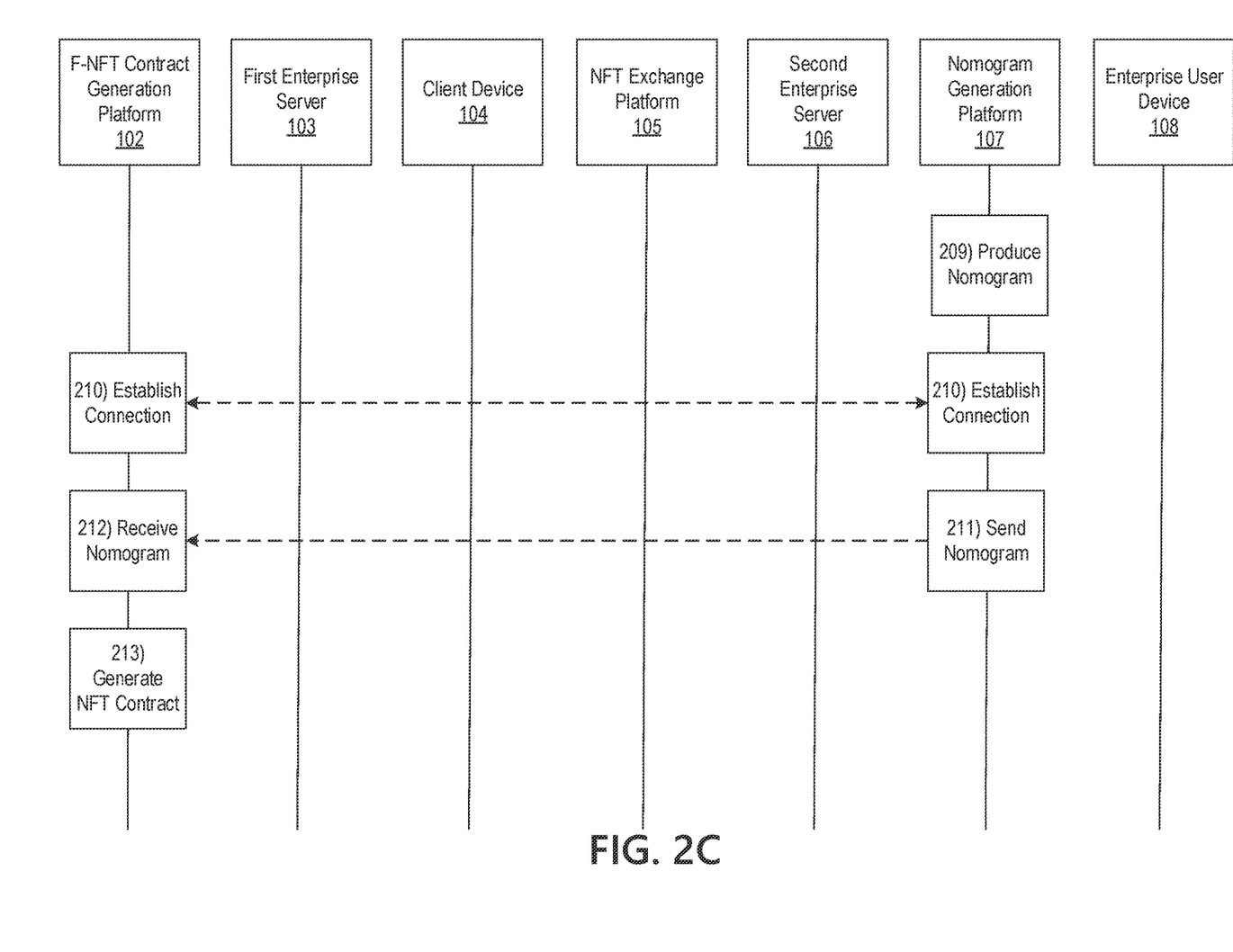

Referring to FIG. 2C, at step 209, the nomogram generation platform 107 may produce a nomogram for each of the one or more documents. For example, the nomogram generation platform 107 may feed the optical features for each document through a smart glass to produce a three dimensional feature nomogram for the corresponding document. In producing the nomogram, the nomogram generation platform 107 may produce a representation of the corresponding document that may be more accurately (e.g., due to enhanced elements of extraction) interpreted for purposes of automatically generating an F-NFT contract. For example, an F-NFT contract generated based on the nomogram may have a likelihood of error or error rate that is higher than an F-NFT contract generated based on the document without use of the nomogram. For example, traditional optical character recognition (OCR) may have difficulty reading characters from documents, so this issue may be addressed through the methods described herein.

At step 210, the nomogram generation platform 107 may establish a connection with the F-NFT contract generation platform 102. For example, the nomogram generation platform 107 may establish a first wireless data connection with the F-NFT contract generation platform 102 to link the nomogram generation platform 107 to the F-NFT contract generation platform 102 (e.g., in preparation for sending nomograms). In some instances, the nomogram generation platform 107 may identify whether or not a connection is already established with the F-NFT contract generation platform 102. If a connection is already established with the F-NFT contract generation platform 102, the nomogram generation platform 107 might not re-establish the connection. If a connection is not yet established with the F-NFT contract generation platform 102, the nomogram generation platform 107 may establish the first wireless data connection as described herein.

At step 211, the nomogram generation platform 107 may send the nomogram to the F-NFT contract generation platform 102. For example, the nomogram generation platform 107 may send the nomogram(s) to the F-NFT contract generation platform 102 while the first wireless data connection is established.

At step 212, the F-NFT contract generation platform 102 may receive the nomogram(s) sent at step 211. For example, the F-NFT contract generation platform 102 may receive the nomogram(s) via the communication interface 113 and while the first wireless data connection is established.

At step 213, the F-NFT contract generation platform 102 may generate, using the text file and/or the nomogram(s), an F-NFT contract. For example, the F-NFT contract generation platform 102 may feed the text file and/or nomogram into a GPT-4 algorithm, which may be configured to output an F-NFT contract. In these instances, the F-NFT contract may identify the F-NFT to be transfer, an intended recipient of the NFT, and/or information about the NFT (e.g., current owner, value, chain of custody information, and/or other information).

Figure 2D:
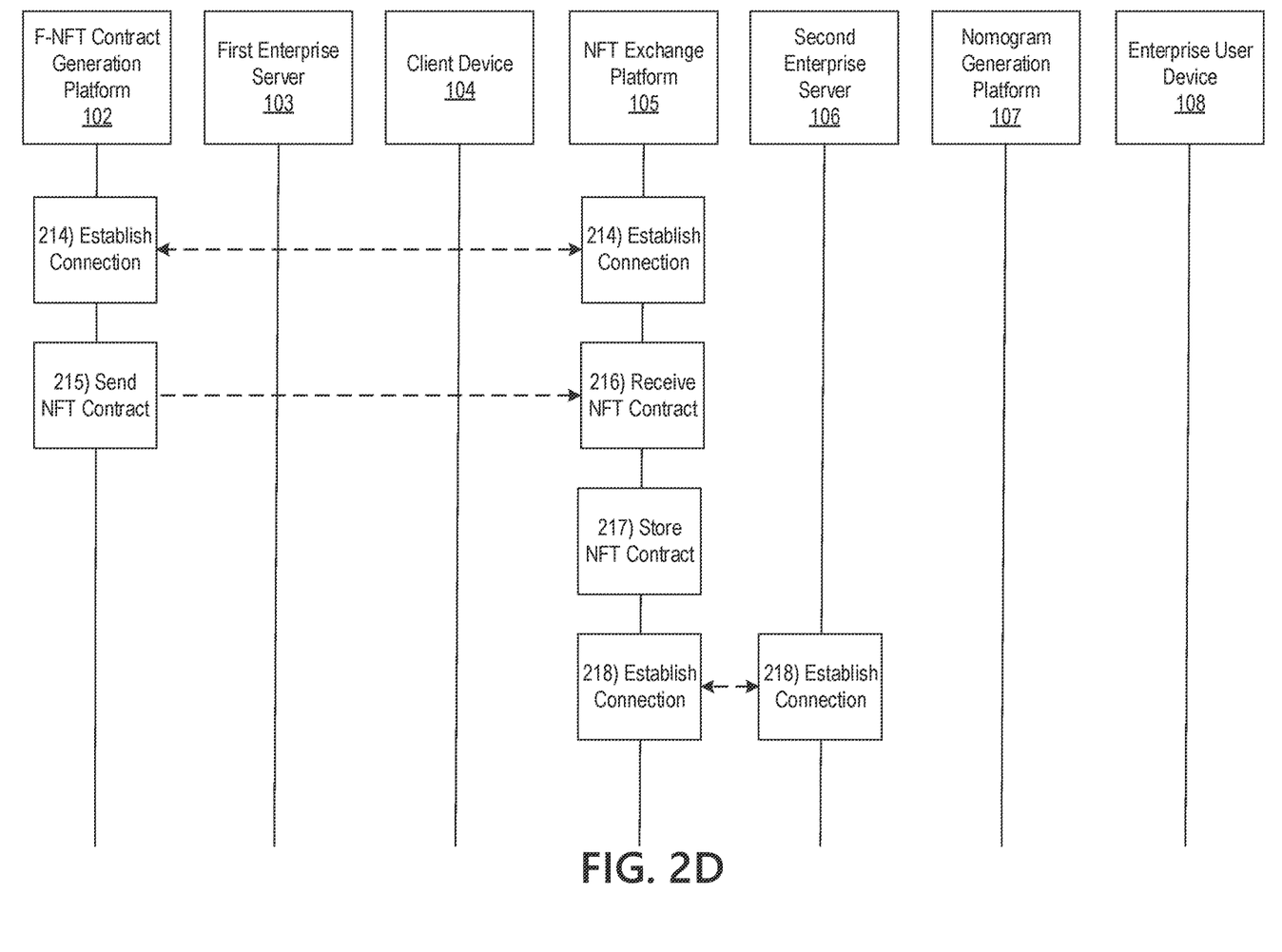

Referring to FIG. 2D, at step 214, the F-NFT contract generation platform 102 may establish a connection with the NFT exchange platform 105. For example, the F-NFT contract generation platform 102 may establish a second wireless data connection with NFT exchange platform 105 to link the F-NFT contract generation platform 102 to the NFT exchange platform 105 (e.g., in preparation for sending F-NFT contracts). In some instances, the F-NFT contract generation platform 102 may identify whether or not a connection is already established with the NFT exchange platform 105. If a connection is already established with the NFT exchange platform 105, the F-NFT contract generation platform 102 might not re-establish the connection. If a connection is not yet established with the NFT exchange platform 105, the F-NFT contract generation platform 102 may establish the second wireless data connection as described herein.

At step 215, F-NFT contract generation platform 102 may send the F-NFT contract to the NFT exchange platform 105. For example, the F-NFT contract generation platform 102 may send the F-NFT contract to the NFT exchange platform 105 via the communication interface 113 and while the second wireless data connection is established.

At step 216, the NFT exchange platform 105 may receive the F-NFT contract sent at step 215. For example, the NFT exchange platform 105 may receive the F-NFT contract while the second wireless data connection is established.

At step 217, the NFT exchange platform 105 may store the F-NFT contract using a distributed ledger, hosted and/or otherwise maintained by the NFT exchange platform 105. For example, the NFT exchange platform 105 may store the F-NFT contract as a new block or entry of the distributed ledger, which may include a chain of custody for the corresponding F-NFT, historical changes in values for the F-NFT, and/or other information. In some instances, the distributed ledger may include F-NFT contracts corresponding to multiple enterprise organizations and/or NFTs/assets stored at those enterprise organizations (e.g., financial institutions). In some instances, in storing the F-NFT, the NFT exchange platform 105 may also validate the F-NFT (e.g., the request to transfer the F-NFT) using the distributed ledger (e.g., does the transferor have custody of the F-NFT, or the like). In these instances, the modification of the distributed ledger to include the F-NFT contract may be based on successfully validating the F-NFT contract.

By implementing the distributed ledger in this way, advantages such as immutability and distributed storage may be achieved in the asset transfer process. Furthermore, by storing the F-NFT contracts in a location accessible to both the first enterprise and the second enterprise, both enterprises may be able to view the F-NFT contract so as to facilitate end-to-end tracking of the transfers. This may address a technical deficiency of current asset transfer solutions, in which tracking of an asset might not be available to the initial party once the asset reaches custody of the recipient party.

At step 218, the NFT exchange platform 105 may establish a connection with the second enterprise server 106. For example, the NFT exchange platform 105 may establish a third wireless data connection with the second enterprise server 106 to link the NFT exchange platform 105 to the second enterprise server 106 (e.g., in preparation for providing access to the distributed ledger). In some instances, the NFT exchange platform 105 may identify whether or not a connection is already established with the second enterprise server 106. If a connection is already established with the second enterprise server 106, the NFT exchange platform 105 might not re-establish the connection. If a connection is not yet established with the second enterprise server 106, the NFT exchange platform 105 may establish the third wireless data connection as described herein.

Figure 2E:
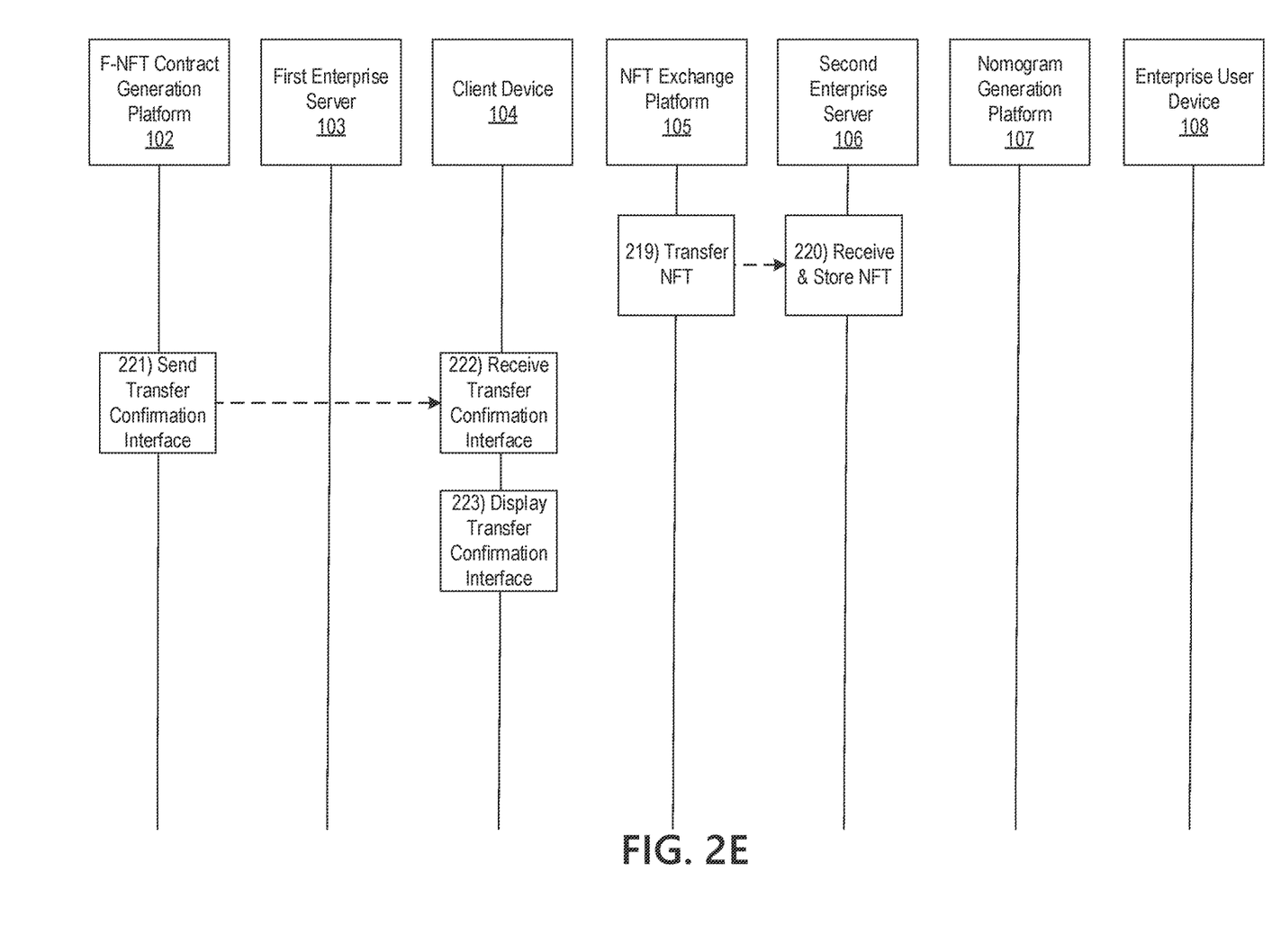

Referring to FIG. 2E, at step 219, the NFT exchange platform 105 may transfer the F-NFT to the second enterprise server 106. For example, the NFT exchange platform 105 may transfer the F-NFT while the third wireless data connection is established.

At step 220, the second enterprise server 106 may receive and store the F-NFT. For example, the second enterprise server 106 may receive the F-NFT while the third wireless data connection is established.

At step 221, the F-NFT contract generation platform 102 may generate and send a transfer confirmation interface to the client device 104. In some instances, the F-NFT contract generation platform 102 may send one or more commands directing the client device 104 to display the transfer confirmation interface. For example, the F-NFT contract generation platform 102 may send the transfer confirmation interface to the client device 104 via the communication interface 113 and while a wireless data connection is established with the client device 104. In some instances, the F-NFT contract generation platform 102 may also send the interface and/or commands to the enterprise user device 108 and/or a client device of the transferee.

At step 222, the client device 104 may receive the transfer confirmation interface. For example, the client device 104 may receive the transfer confirmation interface while a wireless data connection is established with the F-NFT contract generation platform 102. In some instances, the client device 104 may also receive the one or more commands directing the client device 104 to display the transfer confirmation interface.

Figure 4:
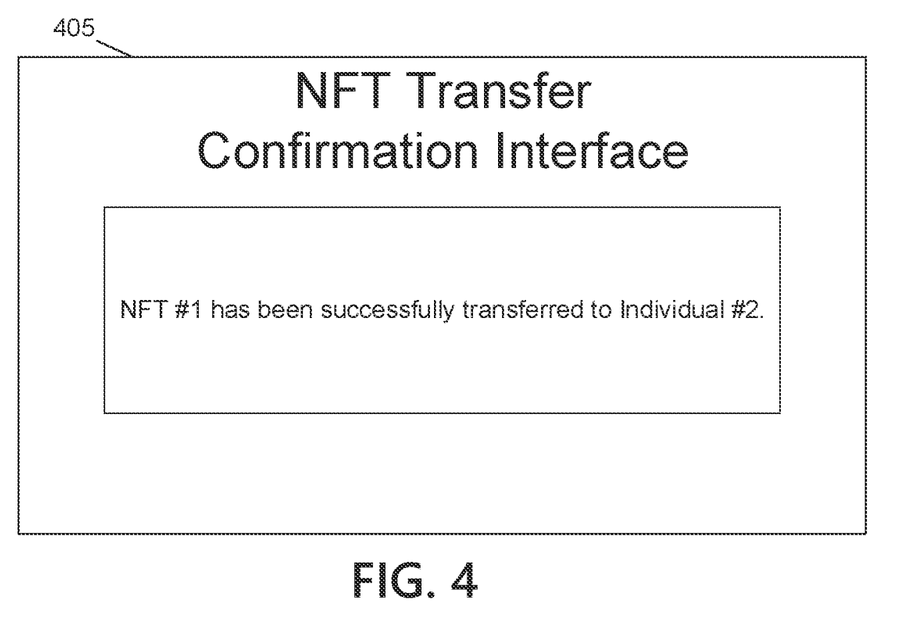
FIGS. 4 and 5 depict illustrative graphical user interfaces for voice based feature extraction and an optical receptive net for improved transfer of NFTs in accordance with one or more example embodiments.
Figure 5:
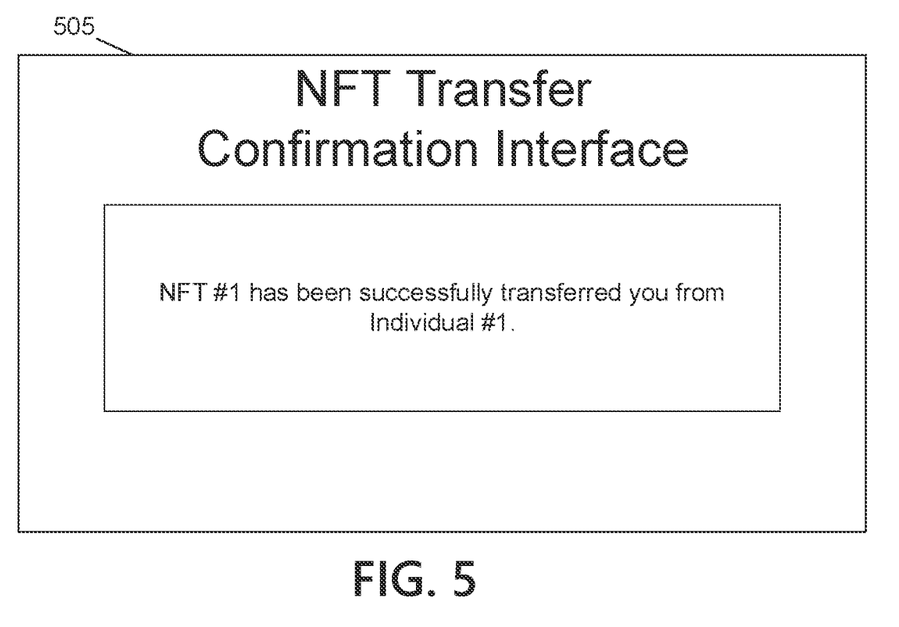

At step 223, based on or in response to the one or more commands directing the client device 104 to display the transfer confirmation interface, the client device 104 may display the transfer confirmation interface. For example, the client device 104 may display a graphical user interface similar to graphical user interface 405 in FIG. 4. Additionally or alternatively, a client device of the transferee may display a graphical user interface similar to graphical user interface 505 in FIG. 5.

Figure 3:
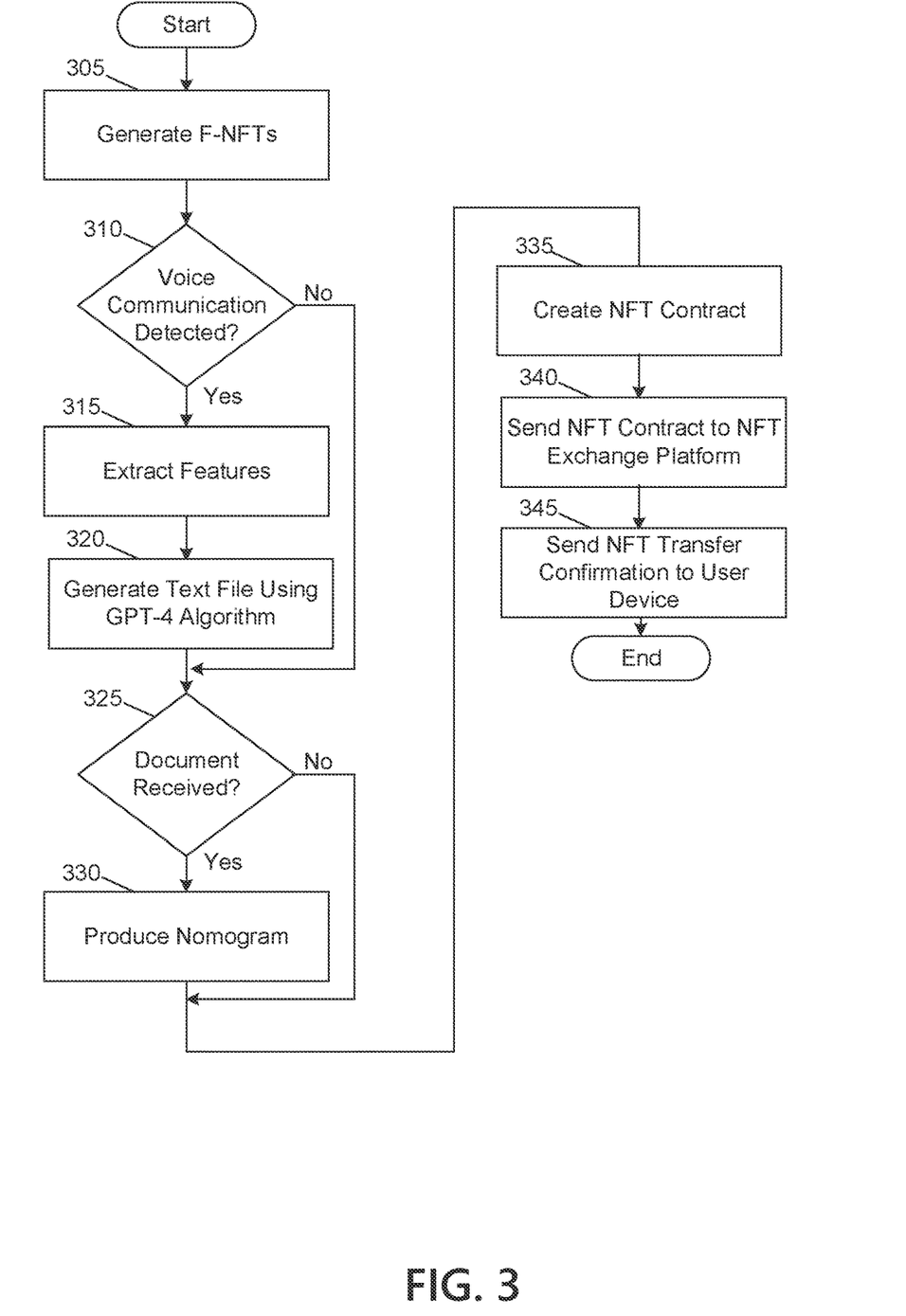
FIG. 3 depicts an illustrative method for voice based feature extraction and an optical receptive net for improved transfer of NFTs in accordance with one or more example embodiments.

FIG. 3 depicts an illustrative method for voice based feature extraction and an optical receptive net for improved transfer of NFTs in accordance with one or more example embodiments. Referring to FIG. 3, at step 305, a computing platform having at least one processor, a communication interface, and memory may generate a plurality of F-NFTs. At step 310, the computing platform may identify whether or not a voice communication is detected. If a voice communication is detected, the computing platform may proceed to step 315. At step 315, the computing platform may extract voice features from the voice communication. At step 320, the computing platform may generate a text file based on the extracted voice features.

Returning to step 310, if no voice communication is detected, the computing platform may proceed to step 325. At step 325, the computing platform may identify whether or not a document has been received. If a document is received, the computing platform may proceed to step 330. At step 330, the computing platform may produce a nomogram for the document.

Returning to step 325, if the computing platform identifies that a document was not received, the computing platform may proceed to step 335. At step 335, the computing platform may generate an NFT contract. At step 340, the computing platform may send the NFT contract to an NFT exchange platform. At step 345, the computing platform may send a confirmation of the NFT transfer to a user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
generate a plurality of fractional non-fungible tokens (F-NFTs), each representative of an asset of a transferor, wherein generating the plurality of F-NFTs includes embedding, in each F-NFT, a corresponding F-NFT identifier;
detect a voice communication including a request to transfer a F-NFT, wherein the request to transfer the F-NFT includes a document;

generate, using the document, a three dimensional optical feature nomogram, wherein generating the three dimensional optical feature nomogram comprises:
    exposing the document to a photon source, wherein light from the photon source is passed through a polarizer and a beam splitter prior to reaching the document, and
    applying an optical receptive net to the exposed document to produce the three dimensional optical feature nomogram, wherein applying the optical receptive net comprises:
        applying a diffraction plate to the exposed document to produce feature maps,
        extracting, from the feature maps, optical features, and
        applying a smart glass to the optical features, to produce the three dimensional optical feature nomogram;
extract, from the voice communication, information of the request;
generate, based on the information of the request, a text file;
input, into a generative pre-trained transformer 4 (GPT-4 algorithm), the text file to produce a F-NFT contract identifying the F-NFT, the transferor of the F-NFT, and a transferee of the F-NFT, wherein the F-NFT contract is generated, based in part, on the document and the three dimensional optical feature nomogram, and wherein use of the three dimensional optical feature nomogram reduces a likelihood of error in the F-NFT contract in comparison to F-NFT contracts generated without use of the three dimensional optical feature nomogram; and
send, to an NFT exchange platform, the F-NFT contract, wherein sending the F-NFT contract causes the NFT exchange platform to transfer custody of the F-NFT from an account of the transferor to an account of the transferee, wherein the account of the transferor is hosted by a first enterprise organization and the account of the transferee is hosted by a second enterprise organization, and wherein the F-NFT is configured for end-to-end tracking, using the corresponding F-NFT identifier, by the first enterprise organization and the second enterprise organization.

2. The computing platform of claim 1, wherein the NFT exchange platform maintains a distributed ledger including F-NFT contracts for the first enterprise organization and the second enterprise organization.

3. The computing platform of claim 2, wherein the NFT exchange platform validates, using the distributed ledger, the request to transfer the F-NFT.

4. The computing platform of claim 3, wherein the NFT exchange platform modifies, based on successful validation of the request to transfer the F-NFT, the distributed ledger to include a new entry indicating the transfer of the F-NFT to the transferee.

5. The computing platform of claim 1, wherein generating the F-NFT contract is further based on the three dimensional optical feature nomogram.

6. The computing platform of claim 5, wherein an error rate of F-NFT generation using the three dimensional optical feature nomogram is lower than an error rate of the F-NFT generation when executed without the three dimensional optical feature nomogram.

7. A method comprising:
at a computing platform comprising at least one processor, a communication interface, and memory:
    generating a plurality of fractional non-fungible tokens (F-NFTs), each representative of an asset of a transferor, wherein generating the plurality of F-NFTs includes embedding, in each F-NFT, a corresponding F-NFT identifier;
    detecting a voice communication including a request to transfer a F-NFT, wherein the request to transfer the F-NFT includes a document;
    generating, using the document, a three dimensional optical feature nomogram, wherein generating the three dimensional optical feature nomogram comprises:
        exposing the document to a photon source, wherein light from the photon source is passed through a polarizer and a beam splitter prior to reaching the document, and
        applying an optical receptive net to the exposed document to produce the three dimensional optical feature nomogram, wherein applying the optical receptive net comprises:
            applying a diffraction plate to the exposed document to produce feature maps,
            extracting, from the feature maps, optical features, and
            applying a smart glass to the optical features, to produce the three dimensional optical feature nomogram;
    extracting, from the voice communication, information of the request;
    generating, based on the information of the request, a text file;
    inputting, into a generative pre-trained transformer 4 (GPT-4 algorithm), the text file to produce a F-NFT contract identifying the F-NFT, the transferor of the F-NFT, and a transferee of the F-NFT, wherein the F-NFT contract is generated, based in part, on the document and the three dimensional optical feature nomogram, and wherein use of the three dimensional optical feature nomogram reduces a likelihood of error in the F-NFT contract in comparison to F-NFT contracts generated without use of the three dimensional optical feature nomogram; and
    sending, to an NFT exchange platform, the F-NFT contract, wherein sending the F-NFT contract causes the NFT exchange platform to transfer custody of the F-NFT from an account of the transferor to an account of the transferee, wherein the account of the transferor is hosted by a first enterprise organization and the account of the transferee is hosted by a second enterprise organization, and wherein the F-NFT is configured for end-to-end tracking, using the corresponding F-NFT identifier, by the first enterprise organization and the second enterprise organization.

8. The method of claim 7, wherein the NFT exchange platform maintains a distributed ledger including F-NFT contracts for the first enterprise organization and the second enterprise organization.

9. The method of claim 8, wherein the NFT exchange platform validates, using the distributed ledger, the request to transfer the F-NFT.

10. The method of claim 9, wherein the NFT exchange platform modifies, based on successful validation of the request to transfer the F-NFT, the distributed ledger to include a new entry indicating the transfer of the F-NFT to the transferee.

11. The method of claim 7, wherein generating the F-NFT contract is further based on the three dimensional optical feature nomogram.

12. The method of claim 11, wherein an error rate of F-NFT generation using the three dimensional optical feature nomogram is lower than an error rate of the F-NFT generation when executed without the three dimensional optical feature nomogram.

13. One or more non-transitory computer-readable media storing instructions that, when executed by a computing platform comprising at least one processor, a communication interface, and memory, cause the computing platform to:
  generate a plurality of fractional non-fungible tokens (F-NFTs), each representative of an asset of a transferor, wherein generating the plurality of F-NFTs includes embedding, in each F-NFT, a corresponding F-NFT identifier;
  detect a voice communication including a request to transfer a F-NFT, wherein the request to transfer the F-NFT includes a document;
  generate, using the document, a three dimensional optical feature nomogram, wherein generating the three dimensional optical feature nomogram comprises:
    exposing the document to a photon source, wherein light from the photon source is passed through a polarizer and a beam splitter prior to reaching the document, and
    applying an optical receptive net to the exposed document to produce the three dimensional optical feature nomogram, wherein applying the optical receptive net comprises:
      applying a diffraction plate to the exposed document to produce feature maps,
      extracting, from the feature maps, optical features, and
      applying a smart glass to the optical features, to produce the three dimensional optical feature nomogram;
  extract, from the voice communication, information of the request;
  generate, based on the information of the request, a text file;
  input, into a generative pre-trained transformer 4 (GPT-4 algorithm), the text file to produce a F-NFT contract identifying the F-NFT, the transferor of the F-NFT, and a transferee of the F-NFT, wherein the F-NFT contract is generated, based in part, on the document and the three dimensional optical feature nomogram, and wherein use of the three dimensional optical feature nomogram reduces a likelihood of error in the F-NFT contract in comparison to F-NFT contracts generated without use of the three dimensional optical feature nomogram; and
  send, to an NFT exchange platform, the F-NFT contract, wherein sending the F-NFT contract causes the NFT exchange platform to transfer custody of the F-NFT from an account of the transferor to an account of the transferee, wherein the account of the transferor is hosted by a first enterprise organization and the account of the transferee is hosted by a second enterprise organization, and wherein the F-NFT is configured for end-to-end tracking, using the corresponding F-NFT identifier, by the first enterprise organization and the second enterprise organization.

14. The one or more non-transitory computer-readable media of claim 13, wherein the NFT exchange platform maintains a distributed ledger including F-NFT contracts for the first enterprise organization and the second enterprise organization.

15. The one or more non-transitory computer-readable media of claim 14, wherein the NFT exchange platform validates, using the distributed ledger, the request to transfer the F-NFT.

16. The one or more non-transitory computer-readable media of claim 15, wherein the NFT exchange platform modifies, based on successful validation of the request to transfer the F-NFT, the distributed ledger to include a new entry indicating the transfer of the F-NFT to the transferee.

17. The one or more non-transitory computer-readable media of claim 13, wherein generating the F-NFT contract is further based on the three dimensional optical feature nomogram.

18. The one or more non-transitory computer-readable media of claim 17, wherein an error rate of F-NFT generation using the three dimensional optical feature nomogram is lower than an error rate of the F-NFT generation when executed without the three dimensional optical feature nomogram.

* * * * *